United States Patent [19]

Taniguchi et al.

[11] Patent Number: 5,667,572
[45] Date of Patent: Sep. 16, 1997

[54] INK COMPOSITION AND PROCESS FOR PRODUCING THE SAME

[75] Inventors: Makoto Taniguchi; Noriko Oyama, both of Suwa, Japan

[73] Assignee: Seiko Epson Corporation, Tokyo-To, Japan

[21] Appl. No.: 579,098

[22] Filed: Dec. 27, 1995

[30] Foreign Application Priority Data

Dec. 27, 1994 [JP] Japan .................................. 6-325638
Jan. 12, 1995 [JP] Japan .................................. 7-003605

[51] Int. Cl.$^6$ ................................................. C09D 11/14
[52] U.S. Cl. ................................ 106/31.36; 106/31.49
[58] Field of Search ........................... 106/25 R, 26 R, 106/23 F, 22 F, 20 R

[56] References Cited

U.S. PATENT DOCUMENTS

| | | | |
|---|---|---|---|
| 5,106,417 | 4/1992 | Hauser et al. | 106/20 D |
| 5,108,505 | 4/1992 | Moffatt | 106/25 R |
| 5,226,957 | 7/1993 | Wickramanayake et al. | 106/25 R |
| 5,302,195 | 4/1994 | Helbrecht et al. | 106/25 R |
| 5,324,349 | 6/1994 | Sano et al. | 106/25 R |
| 5,503,664 | 4/1996 | Sano et al. | 106/20 R |

FOREIGN PATENT DOCUMENTS

| | | |
|---|---|---|
| 56-147859 | 11/1981 | Japan . |
| 57-059970 | 4/1982 | Japan . |
| 59-004665 | 1/1984 | Japan . |
| 61-053372 | 3/1986 | Japan . |
| 63-162773 | 7/1988 | Japan . |

*Primary Examiner*—Helene Klemanski
*Attorney, Agent, or Firm*—Ladas & Parry

[57] ABSTRACT

An ink composition which can provide a print having better water fastness, stably contains a colorant substantially insoluble or sparingly soluble in water, is less likely to cause clogging of a recording head, and can be advantageously used for ink jet recording is disclosed. The ink composition comprises: a colorant which is either sparingly soluble or insoluble in water; a water-soluble organic solvent capable of dissolving the colorant; a saccharide and/or polyvinyl pyrrolidone; and water.

18 Claims, No Drawings

INK COMPOSITION AND PROCESS FOR PRODUCING THE SAME

BACKGROUND OF THE INVENTION

1. Field of the Invention

This invention relates to an ink composition for ink jet recording and more particularly an ink composition, comprising a water-insoluble colorant, which can provide prints having excellent water fastness.

2. Background Art

In the conventional ink jet recording system, ink droplets are ejected and deposited onto a recording paper by means of an electrostatic suction method, a pneumatic ink feed method, a method utilizing electric deformation of an piezoelectric element, and a method utilizing pressure generated by heat foaming. In this recording system, the ink used is mainly a water-base ink composition comprising a solution of a water-soluble dye dissolved in water and, dissolved therein, a humectant such as a glycol, and a penetration agent such as an alcohol or pyrrolidone.

A print provided by the water-base ink composition using a water-soluble dye has a drawback that, upon contact with water, the dye is eluted from the printed area because of its water-soluble nature. Further, in general, since the water-soluble dye has a water-soluble group, such as a carboxylic, sulfonic, or amine group, it is said to be inferior in light fastness to water-insoluble colorants.

Various water-base ink compositions and processes for producing the same have been proposed in the art in order to solve these problems. For example, Japanese Patent Laid-Open Nos. 59970/1982, 53372/1986, and 162773/1988 disclose an ink composition using a dye which is insoluble in water but soluble in a water-soluble organic solvent.

Further, Japanese Patent Laid-Open No. 4665/1984 proposes a water-base ink composition using a disperse dye, and Japanese Patent Laid-Open No. 147859/1981 proposes a water-base ink composition with a water-insoluble pigment dispersed therein.

These water-base ink compositions, however, have still room for improvement. In particular, a colorant substantially insoluble or sparingly soluble in water for the purpose of improving the water fastness of the print is likely to cause clogging of a nozzle in a recording head. The reason for the occurrence of this unfavorable phenomenon is considered to be reside in that it is not easy for a colorant insoluble or sparingly soluble in water to stably exist in a water-base ink composition and that the sparingly soluble colorant is precipitated at the front end of the nozzle in the recording head.

SUMMARY OF THE INVENTION

An object of the present invention is to provide a water-base ink composition, which can provide a print having better water fastness, stably contains a colorant which is substantially insoluble or sparingly soluble in water, and is less likely to cause clogging of a recording head.

Another object of the present invention is to provide an ink composition which can provide a print having excellent water fastness and is less likely to cause clogging of a recording head and, in addition, can provide a print having excellent rubbing resistance.

The present inventors have now found that the addition of a saccharide or polyvinyl pyrrolidone to an ink composition can provide an ink composition stably containing a colorant which is substantially insoluble or sparingly soluble in water.

Accordingly, the ink composition of the present invention comprises: a colorant which is either sparingly soluble or insoluble in water; a water-soluble organic solvent capable of dissolving the colorant; a saccharide and/or polyvinyl pyrrolidone; and water.

PREFERRED EMBODIMENTS OF THE INVENTION

The water-base ink composition of the present invention comprises basically least a colorant either sparingly soluble or insoluble in water, a water-soluble organic solvent, a saccharide and/or polyvinyl pyrrolidone, and water.

Colorant

The colorant used in the present invention is a dye or pigment which is either sparingly soluble or insoluble in water. The "either sparingly soluble or insoluble in water" means that the solubility in water at 20° C. is not more than about 1% by weight, still preferably not more than 0.5 % by weight. Preferred examples of the dye or pigment include colorants which are classified, in the art, as oil dyes and disperse dyes or pigments readily soluble in an organic solvent. The use of the above colorants can provide prints having excellent fastness, particularly good water fastness and light fastness. These colorants may be used alone or as a mixture of two or more.

In the ink composition of the present invention, the colorant is preferably present in a dispersed state. Specifically, the colorant is present as fine particles in the ink composition of the present invention. It is not easy to define the boundary between the dissolution of a substance and the dispersion of the substance. However, according to a preferred embodiment of the present invention, the colorant can be found as particles in the ink composition. Color development of a print using the ink composition of the present invention depends mainly upon the colorant particles. According to a preferred embodiment of the present invention, the colorant particles have an average particle diameter of preferably about 10 nm to 10 µm, still preferably about 25 to 500 nm. Further, according to a preferred embodiment of the present invention, the colorant particles are preferably regulated, from the viewpoint of preventing clogging, so as to have such a distribution in number of particles that the amount of the particles having a diameter exceeding 20 µm is less than 1 ppm.

On the other hand, according to a preferred embodiment of the present invention, the ink composition of the present invention is substantially free from any dispersant. For a person having ordinary skill in the art, it will be surprising that colorant particles are dispersible in an ink composition substantially without any dispersant. The expression "substantially free from any dispersant" means that any dispersant commonly used in conventional ink compositions is not contained at all or is contained in a concentration below the critical micell concentration (CMC). In general, the critical micell concentration is from about 0.01 to 3.6% by weight depending upon the kind of the dispersant ("Shin-ban Kaimen Kassei Zai Hando Bukku," 119–127 (1991), Yoshida, Shindo, Ohgaki, and Nakayama, published by Kogaku Tosho K. K.). Therefore, according to a preferred embodiment of the present invention, the dispersant is contained preferably in a concentration below the critical micell concentration.

The colorant used in the present invention should be soluble in a solid solvent which will be described below.

The amount of the colorant added is preferably 0.5 to 20% by weight, still preferably about 2 to 10% by weight, based on the ink composition.

Specific preferred examples of the colorant include:

yellow oil dyes, such as Oil Yellow 105 (trade name, Orient Chemical Industries, Ltd.), Oil Yellow 107 (trade name, Orient Chemical Industries, Ltd.), Oil Yellow 129 (trade name, Orient Chemical Industries, Ltd., C.I. Solvent Yellow 29), Oil Yellow 3G (trade name, Orient Chemical Industries, Ltd., C.I. Solvent Yellow 16), Oil Yellow GGS (trade name, Orient Chemical Industries, Ltd., C.I. Solvent Yellow 56), Valifast Yellow 1101 (trade name, Orient Chemical Industries, Ltd.), Valifast Yellow 1105 (trade name, Orient Chemical Industries, Ltd.), Valifast Yellow 4120 (trade name, Orient Chemical Industries, Ltd., C.I. Solvent Yellow 82), Oleosol Brilliant Yellow 5G (trade name, Taoka Chemical co., Ltd., C.I. Solvent Yellow 150), Oleosol Fast Yellow 2G (Taoka Chemical co., Ltd., C.I. Solvent Yellow 21), Oleosol Fast Yellow GCN (Taoka Chemical co., Ltd., C.I. Solvent Yellow 151), Aizen Sot Yellow 1 (trade name, Hodogaya Chemical Co., Ltd., C.I. Solvent Yellow 56), Aizen Sot Yellow 3 (trade name, Hodogaya Chemical. Co., Ltd., C.I. Solvent Yellow 16), Aizen Sot Yellow 6 (trade name, Hodogaya Chemical Co., Ltd., C.I. Solvent Yellow 33), Aizen Spilon Yellow GRLH (trade name, Hodogaya Chemical Co., Ltd.), Aizen Spilon Yellow 3RH (trade name, Hodogaya Chemical Co., Ltd.), Orasol Yellow 2GLN (trade name, Ciba-Geigy, C.I. Solvent Yellow 88), Orasol Yellow 2RLN (trade name, Ciba-Geigy, C.I. Solvent Yellow 89), Orasol Yellow 3R (trade name, Ciba-Geigy, C.I. Solvent Yellow 25), Oracet Yellow GHS (trade name, Ciba-Geigy, C.I. Solvent Yellow 163), and FILAMID Yellow R (trade name, Ciba-Geigy, C.I. Solvent Yellow 21);

red oil dyes, such as Oil Red 5B (trade name, Orient Chemical Industries, Ltd., C.I. Solvent Red 27), Oil RED RR (trade name, Orient Chemical Industries, Ltd., C.I. Solvent Red 24), Valifast Red 1306 (trade name, Orient Chemical Industries, Ltd., C.I. Solvent Red 109), Valifast Red 1355 (trade name, Orient Chemical Industries, Ltd.), Valifast Red 2303 (trade name, Orient Chemical Industries, Ltd.), Valifast Red 3304 (trade name, Orient Chemical Industries, Ltd., C.I. Solvent Red 8), Valifast Red 3306 (trade name, Orient Chemical Industries, Ltd.), Valifast Red 3320 (trade name, Orient Chemical Industries, Ltd., C.I. Solvent Red 132), Oil Pink 312 (trade name, Orient Chemical Industries, Ltd.), Valifast Pink 2310N (trade name, Orient Chemical Industries, Ltd., C.I. Solvent Red 218), Oleosol Fast Red BL (trade name, Taoka Chemical Co., Ltd., C.I. Solvent Red 132), Oleosol Fast Red RL (trade name, Taoka Chemical Co., Ltd., C.I. Solvent Red 122), Oleosol Fast Red GL (trade name, Taoka Chemical Co., Ltd., C.I. Solvent Red 132), Oleosol Red 2G (trade name, Taoka Chemical Co., Ltd.), Oleosol Fast Pink FB (trade name, Taoka Chemical Co., Ltd., C.I. Solvent Red 218), Aizen Sot Red 1 (trade name, Hodogaya Chemical Co., Ltd., C.I. Solvent Red 24), Aizen Sot Red 2 (trade name, Hodogaya Chemical Co., Ltd., C.I.. Solvent Red 27), Aizen Sot Red 3 (trade name, Hodogaya Chemical Co., Ltd., C.I. Solvent Red 18), Aizen Spilon Red BEH (trade name, Hodogaya Chemical Co., Ltd.), Aizen Spilon Red GEM (trade name, Hodogaya Chemical Co., Ltd.), Aizen Spilon Red C-GH (trade name, Hodogaya Chemical Co., Ltd.), Aizen Sot Pink 1 (trade name, Hodogaya Chemical Co., Ltd., C.I. Solvent Red 49), Orasol Red 3GL (trade name, Ciba-Geigy, C.I. Solvent Red 130), Orasol Red 2BL (trade name, Ciba-Geigy, C.I. Solvent Red 132), Orasol Red G (trade name, Ciba-Geigy, C.I. Solvent Red 125), Orasol Red B (trade name, Ciba-Geigy, C.I. Solvent Red 7), FILAMID Red GR (trade name, Ciba-Geigy, C.I. Solvent Red 225), FILESTER Red GA (trade name, Ciba-Geigy, C.I. Solvent Red 135), FILESTER Red RBA (trade name, Ciba-Geigy, C.I. Solvent Red 230), and Orasol Pink 5BLG (trade name, Ciba-Geigy, C.I. Solvent Red 127);

blue oil dyes, such as Oil Blue 613 (trade name, Orient Chemical Industries, Ltd.), Oil Blue 2N (trade name, Orient Chemical Industries, Ltd., C.I. Solvent Blue 35), Oil Blue BOS (trade name, Orient Chemical Industries, Ltd.), Valifast Blue 1603 (trade name, Orient Chemical Industries, Ltd.), Valifast Blue 1605 (trade name, Orient Chemical Industries, Ltd., C.I. Solvent Blue 38), Valifast Blue 1607 (trade name, Orient Chemical Industries, Ltd.), Valifast Blue 2606 (trade name, Orient Chemical Industries, Ltd., C.I. Solvent Blue 70), Valifast Blue 2610 (trade name, Orient Chemical Industries, Ltd.), Oleosol Fast Blue ELN (trade name, Taoka Chemical Co., Ltd., C.I. Solvent Blue 70), Oleosol Fast Blue GL (trade name, Taoka Chemical Co., Ltd., C.I. Solvent Blue 70), Oleosol Blue G (trade name, Taoka Chemical Co., Ltd.), Aizen Sot Blue 1 (trade name, Hodogaya Chemical Co., Ltd., C.I. Solvent Blue 25), Aizen Sot Blue 2 (trade name, Hodogaya Chemical Co., Ltd., C.I. Solvent Blue 14), Aizen Spilon Blue GNH (trade name, Hodogaya Chemical Co., Ltd.), Aizen Spilon Blue 2BNH (trade name, Hodogaya Chemical Co., Ltd.), Aizen Spilon Blue BPNH (trade name, Hodogaya Chemical Co., Ltd.), Orasol Blue GN (trade name, Ciba-Geigy, C.I. Solvent Blue 67), Orasol Blue 2GLN (trade name, Ciba-Geigy, C.I. Solvent Blue 48), Oracet Blue 2R (trade name, Ciba-Geigy, C.I. Solvent Blue 68), FILAMID Blue R (trade name, Ciba-Geigy, C.I. Solvent Blue 132), and FILESTER Blue GN (trade name, Ciba-Geigy, C.I. Solvent Blue 67); and black oil dyes, such as Oil Black HBB (trade name, Orient Chemical Industries, Ltd., C.I. Solvent Black 3), Oil Black 860 (trade name, Orient Chemical Industries, Ltd., C.I. Solvent Black 3), Oil Black BS (trade name, Orient Chemical Industries, Ltd., C.I. Solvent Black 7), Valifast Black 1802 (trade name, Orient Chemical Industries, Ltd.), Valifast Black 1807 (trade name, Orient Chemical Industries, Ltd.), Valifast Black 3804 (trade name, Orient Chemical Industries, Ltd., C.I. Solvent Black 34), Valifast Black 3810 (trade name, Orient Chemical Industries, Ltd., C.I. Solvent Black 29), Valifast Black 3820 (trade name, Orient Chemical Industries, Ltd., C.I. Solvent Black 27), Valifast Black 3830 (trade name, Orient Chemical Industries, Ltd.), Spirit Black SB (trade name, Orient Chemical Industries, Ltd., C.I. Solvent Black 5), Spirit Black SSBB (trade name, Orient Chemical Industries, Ltd., C.I. Solvent Black 5), Spirit Black AB (trade name, Orient Chemical Industries, Ltd., C.I. Solvent Black 5), Nigrosin base (trade name, Orient Chemical Industries, Ltd., C.I. Solvent Black 7), Oleosol Fast Black RL (trade name, Taoka Chemical Co., Ltd., C.I. Solvent Black 27), Oleosol Fast Black AR (trade name, Taoka Chemical Co., Ltd.), Aizen Sot Black 6 (trade name, Hodogaya Chemical Co., Ltd., C.I. Solvent Black 3), Aizen Sot Black 8 (trade name, Hodogaya Chemical Co., Ltd., C.I. Solvent Black 7), Aizen Spilon Black MH (trade name, Hodogaya Chemical Co., Ltd.), Aizen Spilon Black GMH (trade name, Hodogaya Chemical Co., Ltd.), Orasol Black CN (trade name, Ciba-Geigy, C.I. Solvent Black 28), and Orasol Black RLI (trade name, Ciba-Geigy, C.I. Solvent Black 29).

Specific examples of the disperse dye include Oracet Yellow 8GF (trade name, Ciba-Geigy, C.I. Disperse Yellow 82), Aizen Sot Yellow 5 (trade name, Hodogaya Chemical Co., Ltd., C.I. Disperse Yellow 3), Sumi Plast Yellow HLR (trade name, Sumitomo Chemical Co., Ltd., C.I. Disperse Yellow 54), Kayaset Yellow A-G (trade name, Nippon Kayaku Co., Ltd. C.I. Disperse Yellow 54), Sumi Plast Red B-2 (trade name, Sumitomo Chemical Co., Ltd., C.I. Disperse Red 191), Kayaset Red B (trade name, Nippon Kayaku Co., Ltd. C.I. Disperse Red 60), and FILESTER Violet BA (trade name, Ciba-Geigy, C.I. Disperse Violet 57).

Preferred examples of the pigments readily soluble in an organic solvent include Hansa Yellow G (trade name, Daido Kasei Co., Ltd., C.I. Pigment Yellow 1), Hansa Yellow GR (trade name, Daido Kasei Co., Ltd., C.I. Pigment Yellow 2), Hansa Yellow 10G (trade name, Daido Kasei Co., Ltd., C.I. Pigment Yellow 3), FILESTER Yellow RNB (trade name, Ciba-Geigy, C.I. Pigment Yellow 147), Kayaset Yellow AR (trade name, Nippon Kayaku Co., Ltd. C.I. Pigment Yellow 147), Kayaset Yellow E-L2R (trade name, Nippon Kayaku Co., Ltd. C.I. Pigment Yellow 142), Permanent Red 4R (trade name, Daido Kasei Co., Ltd., C.I. Pigment Red 3), Poppy Red (Dainichiseika Color & Chemicals Manufacturing. Co., Ltd., C.I. Pigment Red 17), Brilliant Fast Scarlet (trade name, Daido Kasei Co., Ltd., Pigment Red 22), 3040 Red (trade name, Dainichiseika Color a Chemicals Manufacturing Co., Ltd., C.I. Pigment Red 23), Fast Pink Lake 6G (trade name, Noma Kagaku Kogyo K. K., C.I. Pigment Red 81), Eosine Lake (trade name, Arimoto Chemical Company Ltd., C.I. Pigment Red 90), Kayaset Red E-CG (trade name, Nippon Kayaku Co., Ltd. C.I. Pigment Red 250), Kayaset Red E-BG (trade name, Nippon Kayaku Co., Ltd. C.I. Pigment Red 249), Carmine BS (trade name, Dainippon Ink and Chemicals Ink., C.I. Pigment Red 114), and Oracet Pink RF (trade name, Ciba-Geigy, C.I. Pigment Red 181).

Saccharide and Polyvinyl Pyrrolidone

The term "saccharide" as used herein refers to monosaccharides, disaccharides, oligosaccharides (including trisaccharides and tetrasaccharides), and polysaccharides, as well as polyhydroxy-dicarboxylic acids.

In the present invention, the polyvinyl pyrrolidone has a molecular weight of preferably about 1,000 to 1,000,000, still preferably about 5,000 to 400,000.

The saccharide and polyvinyl pyrrolidone have a number of hydroxyl groups or hydrophilic portions and, hence, have high affinity for water molecules, effectively preventing the evaporation of water. Further, they are advantageous also in that, when an ink is unfavorably dried in a nozzle of a recording head resulting in precipitation, they can easily dissolve and remove the precipitate. The use of the saccharide or polyvinyl pyrrolidone in combination with the above colorant can effectively prevent a nozzle from being clogged. While there is no intention of being bound by any particular theory to account for effective prevention of clogging, the reason for this is believed as follows. The precipitate which is as a result of drying of the ink composition of the present invention at the front end of the nozzle is composed mainly of a saccharide or polyvinyl pyrrolidone and a colorant. Upon resumption of the supply of the ink composition into the nozzle, the saccharide or polyvinyl pyrrolidone is mainly brought to a hydrated form by water and swollen and disintegrates the precipitate. This causes the precipitate clogging the nozzle to be easily removed, thus preventing clogging of the nozzle. In the ink composition of the present invention, the colorant is preferably present as a dispersion of particles rather than as a solution. Therefore, when printing is carried out using the ink composition on a recording medium, such as paper, the colorant particles stay on the surface of the recording medium. Since, however, the saccharide and polyvinyl pyrrolidone are dissolved in other solvent component(s), such as water, it, together with the solvent component, is penetrated into the recording medium. As a result, a print formed on the surface of the recording medium consists essentially of a colorant either sparingly soluble or insoluble in water. The content of the saccharide or polyvinyl pyrrolidone in the print is low enough not to adversely affect the water fastness of the print. Thus, good water fastness of the print can be maintained.

The amount of the saccharide added is preferably in the range of from about 1 to 50% by weight, still preferably from about 5 to 20% by weight. The amount of polyvinyl pyrrolidone added is preferably in the range of from about 0.1 to 10% by weight, still preferably from about 0.5 to 5% by weight.

Specific preferred examples of the saccharide include erythrose, threose, erythritol, arabinose, arabitol, xylose, xylitol, lyxose, ribose, ribitol, xylose, xylulose, ribulose, deoxyribose, altrose, allose, idose, galactose, fucose, galactitol, galacturonic acid, mucic acid, glucose, quinovose, glucitol, gluconic acid, glucuronic acid, glucaric acid, gulose, talose, mannose, mannitol, rhamnose, sorbose, tagatose, psicose, fructose, deoxyglucose, digitoxose, digitalose, cymarose, iduronic acid, δ-gluconic lactone, deoxy gluconic acid, ketogulonic acid, galactosamine, glucosamine, mannosamine, muramic acid, sucrose, cellobiose, maltose, lactose, aldonic acid, glucitol, sorbit, trehalose, maltotoriose, alginic acid, cyclodextrin, starch and derivatives thereof (e.g., hydroxyoxypropyl starch), cellulose and derivatives thereof (e.g., carboxymethyl cellulose and calcium salt thereof, hydroxyoxypropylmethyl cellulose having a low degree of ether substitution, crystalline cellulose, and α-cellulose). According to a preferred embodiment of the present invention, δ-gluconic lactone, D-gluconic acid, D-galacturonic acid, D-glucuronic acid, mucic acid, L-tartaric acid, D-tartaric acid, DL-tartaric acid, mesotartaric acid, D-mannitol, starch, dextrin, hydroxyoxypropyl starch, carboxymethyl cellulose and calcium salt thereof, hydroxyoxypropylmethyl cellulose having a low degree of ether substitution, crystalline cellulose, and α-cellulose are used.

Water-Soluble Organic Solvent

The water-soluble organic solvent used in the ink composition of the present invention dissolves the above colorant. Specifically, the colorant used is soluble in the water-soluble organic solvent. The term "soluble" used herein means that the solubility of the selected colorant in the water-soluble organic solvent at room temperature is preferably not less than 2% by weight, still preferably not less than 5% by weight. However, it should be noted that even though the solubility of the colorant in the water-soluble organic solvent at room temperature is less than 2% by weight, such a water-soluble organic solvent can be used when the solubility of the colorant is not less than 2% by weight at a temperature up to the boiling point of The water-soluble organic solvent.

According to a preferred embodiment of the present invention, the water-soluble organic solvent has a lower vapor pressure than water and is compatible with water in any ratio, preferably 50 wt% or more of solubiity in water. In this embodiment, when the solvent component of the ink composition is evaporated from the meniscus portion of the ink at the front end of the nozzle of a recording head, water is preferentially evaporated. This causes the concentration of the water-soluble organic solvent to be increased in the meniscus of the ink and its vicinity. The concentrated water-soluble organic solvent can advantageously dissolve the colorant which is in a particulate state in the ink composition, preventing the nozzle from being clogged with the precipitate of the colorant. Further, printing using the ink composition according to this embodiment can provide a better print. The reason for this is as follows. When the ink composition is dried on a recording medium after printing, water is preferentially evaporated resulting in concentration of the water-soluble organic solvent. The concentrated water-soluble organic solvent dissolves the colorant portion in the ink composition to from a colorant phase. The colorant phase can uniformly wet the recording medium, enabling the print to be firmly deposited on the recording medium.

In the present invention, the water-soluble organic solvent, either alone or as a mixture of two or more, should dissolve the colorant. However, it should be noted that, in the final ink composition, the colorant is not required to be in a dissolved state. This means that, for the final ink composition, the solubility derived from the water-soluble organic solvent may be low. Further, the ink composition having a low solubility does not advantageously attack a resin or an adhesive constituting the ink passage of an ink jet recording apparatus.

According to a preferred embodiment of the present invention, the content of the water-soluble organic solvent in the ink composition is preferably in the range of from about 1 to 35% by weight, still preferably from about 5 to 25% by weight, based the ink composition.

In the present invention, the water-soluble organic solvent of the present invention may be used alone or as a mixture of two or more.

Specific preferred examples of the water-soluble organic solvent used An the present invention include alcohols such as ethylene glycol, propylene glycol, 1, 3-butanediol, 1, 4-butanediol, 1, 5-pentanediol, 2-butane-1, 4-diol, 2-methyl-2, 4-pentanediol, glycerin, and 1,2,6-hexanetriol; ethers such as diethylene glycol dimethyl ether and diethylene glycol diethyl ether; ketches such as acetonylacetone, esters such as γ-butyrolactone, diacetin, ethylene carbonate, and triethyl phosphate; nitrogen compounds such as formamide, dimethyl formamide, diethyl formamide, dimethyl acetamide, 2-pyrrolidone, and N-methyl-2-pyrrolidone; sulfur compounds such as dimethyl sulfoxide, sulfolane, 1,3-propanesultone; multifunctional compounds such as 2-methoxyethanol, 2-ethoxyethanol, 2-(methoxymethoxy) ethanol, 2-isopropoxyethanol, 2-butoxyethanol, 2-isopenthyloxyethanol, furfuryl alcohol, tetrahydrofurfuryl alcohol, diethylene glycol diethylene glycol monomethyl ether, diethylene glycol monoethyl ether, diethylene glycol monobutyl ether, triethylene glycol, triethylene glycol monomethyl ether, tetraethylene glycol, propylene glycol monomethyl ether, propylene glycol monoethyl ether, dipropylene glycol, dipropylene glycol monomethyl ether, dipropylene glycol monoethyl ether, tripropylene glycol monomethyl ether, diacetone alcohol, monoethanolamine, thiodiglycol, morpholine, N-ethylmorpholine, 2-methoxyethyl acetate, diethylene glycol monoethyl ether acetate, and hexamethylphosphoramide.

Water and Other Components

Water used in the ink composition of the present invention is preferably pure water or ultrapure water, such as ion-exchanged water, water purified by ultrafiltration, water purified by reverse osmosis, and distilled water. Further, the use of water, which has been sterilized by ultraviolet irradiation, addition of hydrogen peroxide or the like, is also preferred because it can prevent the growth of mold and bacteria during storage for a long period of time.

According to a preferred embodiment of the present invention, the ink composition of the present invention contains a water-soluble resin. The incorporation of the water-soluble resin results in improved rubbing resistance of prints. Examples of the water-soluble resin usable in the present invention include resins having a nonionic hydrophilic group, such as a hydroxyl, carbonyl, polyethyleneoxyl, alkoxy, lactam, or ester group; and resins having an ionic hydrophilic group, such as an alkali metal, ammonium, inorganic acid, or organic acid salt of a sulfonic, carboxylic, or amino group. They may used alone or as a mixture of two or more.

Specific examples of the water-soluble resin include nonionic polymers such as polyvinyl alcohol, polyvinyl methyl ether, polyethylene oxide, polyethylene glycol, polypropylene glycol, polyacrylamlde, vinyl alcohol/vinyl acetate copolymer, partially formalated polyvinyl alcohol, partially butyralated polyvinyl alcohol, and vinylpyrrolidone/vinyl acetate copolymer; and ionic polymers, for example, naturally occurring polymers, such as alginates, gelatin, albumin, casein, gum arabic, tragacanth gum, and lignin sulfonates, and synthetic polymers, such as polyacrylates, polyvinyl sulfates, poly(4-vinylpyridine) salt, polyamides, polyallylamine salts, condensed naphthalenesulfonates, styrene/acrylate copolymer, styrene/methacrylate copolymer, acrylic ester/acrylate copolymer, acrylic ester/methacrylate copolymer, methacrylic ester/acrylate copolymer, methacrylic ester/methacrylate copolymer, styrene/itaconate copolymer, itaconic ester/itaconate copolymer, vinylnaphthalene/acrylate copolymer, vinylnaphthalene/methacrylate copolymer, and vinylnaphthalene/itaconate copolymer.

Preferably, thee water-soluble resin has a weight-average molecular weight of 2,000 to 1,000,000. When the weight-average molecular weight is not less than2,000, the rubbing resistance of the image can be advantageously improved. A weight-average molecular weight of not more than 1,000, 000 can advantageously bring the viscosity of the ink composition to a value falling within a viscosity range suitable for ejection of the ink in an ink jet recording system.

The amount of the water-soluble resin added is preferably in the range of from 0.01 to 20% by weight based on the total amount of the ink. Especially, in the case of a water-soluble resin having an ionic hydrophilic group, the addition in an amount of not more than 10% by weight is preferred from the viewpoint of water fastness of the image.

If necessary, suitable additives may be further added to the ink composition of the present invention in order to improve various properties of the ink. Specific examples of the additive include penetration promoters, viscosity modifiers, surface tension modifiers, surfactants, pH adjustors, hydrotropy modifiers, humectants, antimolds, preservatives, chelating agents, and rust preventives. When the ink composition is used in an ink jet recording system utilizing electrification, a specific resistance modifier selected from inorganic salts, such as lithium chloride, sodium chloride, and ammonium chloride, may be added to the ink composition.

Preferred examples of the penetration promoter include water-soluble organic solvents, such as ethanol, isopropanol, butanol, acetone, methyl ethyl ketone, pentanol, and allyl alcohol, end nonionic surfactants. According to a preferred embodiment of the present invention, the water-soluble organic solvent added as the penetration promoter is preferably such that it does not dissolve the water-soluble colorant at all or slightly dissolves the water-soluble colorant. The solubility of the water-soluble colorant in the water-soluble organic solvent as the penetration promoter is preferably less than 1% by weight. Such an water-soluble organic solvent does not dissolve particles of the colorant in the ink composition, and, at the same time, can regulate the penetration of the ink in a wide range by regulating the amount thereof added. The penetration rate of the ink composition according to the present invention is preferably nor more than 20 sec with or without the addition of the penetration promoter when the amount of the printing ink is 2.5 mg/cm$^2$.

Preferred examples of the viscosity modifier include water-soluble resins, such as polyvinyl alcohol, polyvinyl pyrrolidone, casein, polyimine, carboxy methyl cellulose, and gum arabic. The viscosity of the ink composition according to the present invention with or without use of the viscosity modifier is preferably not more than 50 cPs at 5° C., still preferably in the range of from 1 to 10 cPs at a temperature of 5° to 35° C.

Preferred examples of the surface tension modifier include nonionic, cationic, or anionic surfactants, and alcohols, such as diethanolamine and triethanolamine. The surface tension of the ink composition according to the present invention is preferably in the range of from 25 to 70 dyn/cm with or without use of the surface tension modifier. When the surface tension is less than 25 dyn/cm, feathering or blurring of letters printed on a recording paper is likely to become significant. On the other hand, when it exceeds 70 dyn/cm, there is a tendency that, when a ruled line is printed, the segregation of ink droplets occurs along the ruled line, causing the print density to become significantly ununiform.

The surfactant can be added to the ink composition in order to lower the surface tension of the ink composition, thereby improving the penetration of the ink into a recording medium. Preferred examples of the surfactant include anionic surfactants such as fatty acid salts, sulfuric ester salts, sulfonic acid salts, and phosphoric ester salts; cationic surfactants such as amine salts, quaternary ammonium salts, and pyridinium salts; nonionic surfactants such as polyethylene oxide or polypropylene oxide derivatives and polyhydric alcohol fatty acid esters; and amphoteric surfactants such as amino acid derivatives, betaine derivatives, and amine derivatives of polyethylene oxide or polypropylene oxide. Thee mount of the surfactant added may be properly determined so that the penetration of the ink composition can be improved. Since, however, the ink composition of the present invention does not require the presence of any dispersant, the concentration of the surfactant in the ink composition is such that the surfactant can serve as a dispersant, that is, below the critical micell concentration of the surfactant.

Preferred examples of the hydrotropy agent include urea, thiourea, water-soluble urea derivatives, for example, polyalkyl derivatives (e.g., tetramethylurea), acetyl derivatives, ethylene derivatives, acetylene derivatives, imino derivatives, methylol derivatives, and amino derivatives. The amount of the hydrotropy agent added is preferably in the range of from 0.01 to 20% by weight based on the ink composition.

Ink Jet Recording

The ink composition of the present invention can be advantageously used in the so-called "ink jet recording." There is no limitation on the ink jet recording system, and the ink can be used in any of an electrostatic suction system, a pneumatic ink feed system, a piezoelectric element system, end a heat foaming system.

Further, the recording medium is also not limited to paper and, for example, may be a sheet for an overhead projector.

Further, when the ink composition of the present invention is used in an ink let recording apparatus, it is preferably filtered between a storage section, such as an ink tank, and a recording head. The opening size of the filer is preferably about ½ of the bore diameter of the ejection nozzle in a recording head.

Production of Ink Composition

The ink composition of the present invention can be prepared preferably by the following two production processes.

The first production comprises the steps of: dissolving a colorant in a water-soluble organic solvent, and mixing the resultant colorant solution with water to precipitate fine particles of the colorant.

Mixing of the colorant solution with water may be carried by any of a method wherein water is added by portions to the colorant solution and a method wherein the colorant solution is added by portions to water. Further, the colorant solution in a predetermined amount and water in a predetermined amount may be continuously added for mixing.

While there is no intention of being bound by any particular theory to account for the reason why the ink composition of the present invention substantially free from any dispersant can be prepared by this method without using any dispersant, the reason for this is believed as follows. The colorant, which dissolved in the water-soluble organic solvent, is in a dissolved molecule state, that is, in a solution form. Mixing of the colorant solution with water in the next step results in lowered solubility of the colorant. This causes the colorant to be changed from a dissolved state to an insoluble state, resulting in the precipitation of the colorant as fine particles. In this case, the colorant precipitates as fine particles having a minimum particle diameter of about 25 nm and almost in a monodisperse state wherein particles do not coalesce. This enables a colorant dispersion to be prepared without use of any mechanical milling means. The reason why fine particles of the colorant precipitate in a monodisperse state has not been clarified yet. It, however, is believed as follows. Since the organic solvent used is soluble in water, upon mixing of the colorant solution with water, the organic solvent present in the colorant phase is transferred to a water phase, resulting in the precipitation of the colorant as a suspension of the colorant alone rather than as an emulsion of droplets formed of the colorant and the organic solvent. For this reason, the coalescence of droplets such as found in the emulsion does not occur, so that particles do not coalesce.

According to a preferred embodiment of the present invention, the colorant solution contain 1 to 30% by weight of the colorant in a dissolved state. This is because when the colorant content is in the above content range, the diameter of precipitated particles can fall within the above preferred diameter range.

Optional additives other than the water-insoluble colorant, water-soluble organic solvent, saccharide or polyvinyl pyrrolidone, and water may be added after the above two steps. Alternatively, in the second step, they may be mixed with water and then mixed with the colorant solution.

The second process for producing the ink composition of the present invention comprises the steps of: dispersing a mixture of a water-insoluble colorant, a water-soluble organic solvent, and water together with a dispersant; and adding water and/or a water-soluble organic solvent and optional other additive to the dispersion and carrying out mixing. However, it should be noted that, in the second step, the amounts of the water and/or water-soluble organic solvent and optional other additive should be such that the concentration of the dispersant in the final ink composition is below the critical micell concentration of the dispersant.

The first step in the second process may be carried out, for example, by mechanical means, such as a roll mill, a ball mill, a colloid mill, a sand mill, an attritor mill, or an agitator mill, electrolytic emulsification, or ultrasonic dispersion.

EXAMPLES

The present invention will now be described in more detail with reference to the following examples, though it is not limited to these examples only.

Example A1

Spirit Black AB (20 g, trade name, Orient Chemical Industries, Ltd., C.I. Solvent Black 5), a black dye, was added by portions to and dissolved in 80 g of N-methyl-2-pyrrolidone with heating and stirring to prepare a colorant solution. The whole of the colorant solution was added to 500 g of a stirred 10 wt% aqueous gluconic-δ-lactone solution over a period of one hr, thereby preparing a black ink dispersion. The average particle diameter as measured by the light scattering method was 350 nm.

Example A2

Oracet Yellow 8GF (30 g, Ciba-Geigy, C.I. Disperse Yellow 82), a yellow dye, was added by portions to and dissolved in a water-soluble organic solvent mixture of 10 g of diethylene glycol and 80 g of N-methyl-2-pyrrolidone to prepare a colorant solution. The whole of the colorant solution was added to 400 g of a stirred 10 wt% aqueous gluconic-δ-lactone solution over a period of one hr, thereby preparing a yellow ink dispersion. The average particle diameter as measured by the light scattering method was 287 nm.

Example A3

N-Methyl-2-pyrrolidone (80 g) was added to 30 g of Permanent Red 4R (Daido Kasei Co., Ltd., C.I. Pigment Red 3), a red pigment, and mixing and dissolution were carried out with heating to prepare a colorant solution. The whole of the colorant solution was added to 500 g of a stirred 6 wt% aqueous carboxymethyl cellulose calcium salt dispersion over a period of one hr, thereby preparing a red ink dispersion. The average particle diameter as measured by the light scattering method was 243 nm.

Example A4

N-Methyl-2-pyrrolidone (80 g) was added to 30 g of Oleosol Black AR (Taoka Chemical Co., Ltd.), a black dye, and mixing and dissolution were carried out with heating to prepare a colorant solution. The whole of the colorant solution was added to 500 g of a stirred 6 wt% aqueous carboxymethyl cellulose (soluble in water) solution over a period of one hr, thereby preparing a black ink dispersion. The average particle diameter as measured by the light scattering method was 193 nm.

Example A5

N-Methyl-2-pyrrolidone (80 g) was added to 30 g of Oleosol Black AR (Taoka Chemical Co., Ltd.), a black dye, and mixing and dissolution were carried out with heating to prepare a colorant solution. The whole of the colorant solution was added to 500 g of a stirred 20 wt% aqueous carboxymethyl cellulose solution over a period of one hr, thereby preparing a black ink dispersion. The average particle diameter as measured by the light scattering method was 193 nm.

Example A6

N-Methyl-2-pyrrolidone (80 g) was added to 20 g of Oil Blue BO (Chuo Synthetic Chemical), a blue dye, and mixing and dissolution were carried out with heating to prepare a colorant solution. The whole of the colorant solution was added to 500 g of a stirred 10 wt% hydroxypropyl starch (insoluble in water) dispersion over a period of one hr, thereby preparing a blue ink dispersion. The average particle diameter as measured by the light scattering method was 248 nm.

Example A7

N-Methyl-2-pyrrolidone (80 g) was added to 20 g of Oil Blue BO (Chuo Synthetic Chemical), a blue dye, and mixing and dissolution were carried out with heating to prepare a colorant solution. The whole of the colorant solution was added to 500 g of a stirred 20 wt% hydroxypropyl starch dispersion over a period of one hr, thereby preparing a blue ink dispersion. The average particle diameter as measured by the light scattering method was 263 nm. For the ink of the present example, the amount of the hydroxypropyl starch added was larger than that for the ink of Example 6. This, however, resulted in no significant increase in viscosity of the ink.

Example A8

Oil Black FS Special A (20 g, Chuo Synthetic Chemical), a black dye, and 80 g of N-methyl-2-pyrrolidone were mixed tog&that and dispersed in each other by means of a horizontal agitator mill for one hr, thereby preparing a colorant solution. The whole of the colorant solution was added to 500 g of a starred aqueous 2 wt% polyvinyl pyrrolidone (GAF, USA, PVPK-15)(soluble in water) solution over a period of one hr, thereby preparing a black ink dispersion. The average particle diameter as measured by the light scattering method was 100 nm. Mechanical dispersion could provide an ink having a smaller particle diameter.

Example A9

Oil Black FS Special A (20 g, Chuo Synthetic Chemical), a black dye, and 80 g of N-methyl-2-pyrrolidone were mixed together and dispersed in each other by means of a horizontal agitator mill for one hr, thereby preparing a colorant solution. The whole of the colorant solution was added to 500 g of a stirred aqueous 10 wt% polyvinyl pyrrolidone (GAF, USA, PVPK-15) solution over a period of one hr, thereby preparing a black ink dispersion. The average particle diameter as measured by the light scattering method was 100 nm.

Example A10

Oil Black FS Special A (20 g, Chuo Synthetic Chemical), a black dye, and 80 g of N-methyl-2-pyrrolidone were mixed together and dispersed in each other by means of a horizontal agitator mill for one hr, thereby preparing a colorant solution. The whole of the colorant solution was added to 500 g of a starred aqueous 2 wt% Crospovidone (GAF, USA, Polyplasdone XL)(insoluble in water) solution over a period of one hr, thereby preparing a black ink dispersion. The average particle diameter as measured by the light scattering method was 134 nm.

Example A11

Oil Black FS Special A (20 g, Chuo Synthetic Chemical), a black dye, and 80 g of N-methyl-2-pyrrolidone were mixed together and dispersed in each other by means of a horizontal agitator mill for one hr, thereby preparing a colorant solution. The whole of the colorant solution was added to 500 g of a stirred aqueous 10 wt% Crospovidone (GAF, USA, Polyplasdone XL)(insoluble in water) solution over a period of one hr, thereby preparing a black ink dispersion. The average particle diameter as measured by the light scattering method was 134 nm. For the ink of the present example, the amount of Crospovidone added was larger than that for the ink of Example 10. This, however, resulted in no significant increase in viscosity of the ink.

Example A12

Spirit Black AB (20 g, Orient Chemical Industries, Ltd., C.I. Solvent Black 5), a black dye, was added to and dissolved in 80 g of N-methyl-2-pyrrolidone. Mixing and dissolution were carried out with heating to prepare a colorant solution. The whole of the colorant solution was added to a stirred solution of 6 g of polyvinyl alcohol PVA103 (Kuraray Co., Ltd.) in 500 g of a 10 wt% aqueous gluconic-δ-lactone solution over a period of one hr, thereby preparing a black ink dispersion. The average particle diameter as measured by the light scattering method was 251 nm.

Comparative Example A1

Spirit Black AB (20 g, trade name, Orient Chemical Industries, Ltd., C.I. Solvent Black 5), a black dye, was added by portions to and dissolved in 80 g of N-methyl-2-pyrrolidone with heating and stirring to prepare a colorant solution. The whole of the colorant solution was added to 500 g of stirred distilled water over a period of one hr, thereby preparing a black ink dispersion. The average particle diameter as measured by the light scattering method was 350 nm.

Comparative Example A2

Spirit Black AB (20 g, Orient Chemical Industries, Ltd., C.I. Solvent Black 5), a black dye, was added to and dissolved in 80 g of N-methyl-2-pyrrolidone. Mixing and dissolution were carried out with heating to prepare a colorant solution. The whole of the colorant solution was added to 500 g of stirred distilled water containing 6 g of polyvinyl alcohol PVA103 (Kuraray Co., Ltd.) over a period of one hr, Thereby preparing a black ink dispersion. The average particle diameter as measured by the light scattering method was 251 nm.

Comparative Example A3

Dimethylformamide (85 g), a water-soluble organic solvent, 10 g of OEI-15 (Nippon Shokubai Kagaku Kogyo Co., Ltd., polyethylene imine), and 395 g of distilled water were mixed together and dissolved in each other to prepare an aqueous dispersant solution. 15 g of MICROLITH Magenta B-WA (Ciba-Geigy, C.I. Pigment Red 184), a red pigment, and the whole of the aqueous dispersant solution were mixed together and dispersed in each other by means of an ultrasonic dispergator with cooling for 5 hr, thereby preparing an ink dispersion with a red pigment dispersed therein. The average particle diameter as measured by the light scattering method was 360 nm.

Comparative Example A4

Dimethylformamide (85 g), a water-soluble organic solvent, 10 g of a styrene/acrylic acid/ethyl acrylate copolymer (molecular weight: about 10000), 395 g of distilled water, and 15 g of MICROLITH Magenta B-WA (trade name, Ciba-Geigy, C.I. Pigment Red 184), a red pigment, were mixed together and dispersed in each other by means of an ultrasonic dispergator with cooling for 5 hr, thereby preparing a red ink dispersion. The average particle diameter as measured by the light scattering method was 360

Comparative Example A5

Oil Black FS Special A (20 g, Chuo Synthetic Chemical), a black dye, was dissolved in a mixed solvent of 490 g of N-methyl-2-pyrrolidone and 10 g of ethanol to prepare an ink.

The ink compositions thus obtained were evaluated as follows.

(1) Resumption of Successful Printing After Clogging

Test (a)

A head of MJ-500 (manufactured by Seiko Epson Corp.) was filled with the ink and allowed to stand without capping for 7 days within a thermostatic chamber under conditions of 40° C. and 30% RH. Thereafter, the head was mounted on MJ-500, and cleaning operation was repeated until ink droplets could be successfully ejected through all the head nozzles. The number of necessary cleaning operations was evaluated according to the following criteria:

⊚: once
○: 3 times
Δ: 10 times
x: Even after ten times of cleaning operation, ink droplets could not be successfully ejected through at least one head nozzle, and normal printing could not be resumed.

Test (b)

A head of MJ-500 was filled with the ink and allowed to stand without capping for 7 days within a thermostatic chamber under conditions of 60° C. and 30% RH. Thereafter, the head was mounted on MJ-500, and cleaning operation was repeated until ink droplets could be successfully ejected through all the head nozzles. The number of necessary cleaning operations was evaluated according to the following criteria:

⊚: Once
○: 3 times
Δ: 10 times
x: Even after ten times of cleaning operation, ink droplets could not be successfully ejected through at least one head nozzle, and normal printing could not be resumed.

Inks evaluated as ⊚ or ○ in test (a) can be satisfactorily used under practical conditions. Test (b) was carried out on the assumption that the ink may be used under severer conditions.

(2) Water Fastness of Printed Image

MJ-500 was filled with the ink, and an image was then formed on XEROX-R (Fuji-Xerox Co., Ltd), a regenerated recording paper. 0.3 ml of pure water was deposited on the image and spontaneously dried. Thereafter, the image was visually inspected for disturbance and evaluated according to the following criteria:

⊚: Image not disturbed
x: Image disturbed (3) Rubbing Resistance of Printed Image MJ-500 was filled with the ink, and an image was then formed on XEROX-P (Fuji-Xerox Co., Ltd), a wood-free recording paper. The image was rubbed with the longitudinal end of a Gem clip while applying a load of 600 g, 400 g, or 100 g, and the image was visually inspected for disturbance, and the results were evaluated according to the following criteria:

⊚: Load of up to 600 g caused no disturbance of image.
○: Load of up to 400 g caused no disturbance of image.
Δ: Load of up to 100 g caused no disturbance of image.
x: Load of 100 g caused disturbance of image.

(4) Quality of Print

MJ-500 was filled with the ink, and an image was formed on XEROX-R, a regenerated recording paper. The image was visually inspected for feathering and blurring. Feathering is a phenomenon wherein an ink is spread along fibers of the paper, resulting disturbance of the image. On the other hand, blurring is a phenomenon wherein an ink is spread over the whole circumference of the image, rendering the image unsharp. The results were evaluated according to the following criteria:

⊚: Neither feathering nor blurring observed.
x: Feathering and/or blurring observed.

TABLE 1

| | Results of evaluation | | | | | |
|---|---|---|---|---|---|---|
| | Resumption of successful printing after clogging | | Water | Rubbing | Quality of | Viscosity |
| Ink Ex. | (a) | (b) | resistance | resistance | print | (cP) |
| A1 | ⊚ | ⊚ | ○ | ○ | ○ | 3.53 |
| A2 | ⊚ | ⊚ | ○ | ○ | ○ | 4.01 |
| A3 | ⊚ | ⊚ | ○ | ○ | ○ | 3.87 |
| A4 | ⊚ | ⊚ | ○ | ○ | ○ | 3.30 |
| A5 | ⊚ | ⊚ | ○ | ○ | ○ | 4.28 |
| A6 | ⊚ | ⊚ | ○ | ○ | ○ | 2.88 |
| A7 | ⊚ | ⊚ | ○ | ○ | ○ | 3.27 |
| A8 | ⊚ | ⊚ | ○ | ○ | ○ | 4.13 |
| A9 | ⊚ | ⊚ | ○ | ○ | ○ | 5.09 |
| A10 | ⊚ | ⊚ | ○ | ○ | ○ | 3.15 |
| A11 | ⊚ | ⊚ | ○ | ○ | ○ | 3.52 |
| A12 | ⊚ | ⊚ | ○ | ⊚ | ○ | 4.87 |
| Comp. Ex. A1 | ○ | Δ | ○ | ○ | ○ | 3.20 |
| Comp. Ex. A2 | Δ | X | ○ | ○ | ○ | 4.51 |
| Comp. Ex. A3 | Δ | X | ○ | X | ○ | 2.71 |
| Comp. Ex. A4 | X | X | ○ | ○ | ○ | 3.50 |
| Comp. Ex. A5 | ⊚ | ○ | ○ | ○ | X | 2.33 |

The following ink compositions were prepared in the same manner as in Example A.

| Example B1 | |
|---|---|
| Sumi Black Red B-2 (C.I. Disperse Red 191, manufactured by Sumitomo Chemical Co., Ltd.) | 10 parts |
| N,N'-dimethylformamide | 15 parts |
| Propylene glycol | 5 parts |
| Maltitol | 5 parts |
| Water | 73 parts |
| Polyvinyl alcohol (manufactured by Kuraray Co., Ltd. Kuraray Poval PVA-103) | 2 parts |
| Example B2 | |
| FILESTER Violet BA (C.I. Disperse Violet 57, manufactured by Chiba-Geigy) | 2 parts |
| Aizen Sot Yellow 5 (C.I. Disperse Yellow 5, manufactured by Modogaya Chemical Co., Ltd.) | 2 parts |
| Sulfolane | 15 parts |
| Sorbitol | 5 parts |
| Water | 76 parts |
| Example B3 | |
| Neozapon Violet 506 (C.I. Solvent Violet 2, manufactured by BASF Japan Ltd.) | 2.7 parts |
| Neozapon Yellow 156 (C.I. Solvent Yellow 21, manufactured by BASF Japan Ltd.) | 0.3 parts |
| Tetrahydrofurfuryl alcohol | 20 parts |
| Polyvinyl pyrrolidone (Koliidan 12 PF, manufactured by BASF Japan Ltd.) | 7 parts |
| Water | 70 parts |

Evaluation test

The ink compositions of Examples B1 to B3 were evaluated for water fastness, reliability, and rubbing resistance by the following methods. In the test, an ink jet printer MJ-500 was used as a recording device.

Evaluation 1

Water Fastness

A 1.5 cm-width full solid printing (100% duty) was carried out on Z691 paper of size A4 (wood-free alkali paper for PPC, manufactured by Fuji Xerox Office Supply Co., Ltd.) at intervals of 3.5 cm (unrecorded area). The printed pater was allowed to stand as it is for 10 min and immersed in 500 cc of water for 10 min. After the immersion, the printed paper was spontaneously dried for 24 hr, and the density of the ink, which had been transferred to the non-recorded area, and the ink residue in the recorded area were visually inspected. The results were evaluated according to the following criteria:

○: No significant deposition on unrecorded area, and no change in density of recorded area.

x: Significant ink deposition on unrecorded area, and lowering in density of recorded area observed.

Evaluation 2

Clogging Derived from Drying of Ink

The interior of the head of %he printer was previously washed well, dried, and mounted on a recording apparatus. It was then filled with the ink composition, and full solid recording was carried out on 3 sheets of paper of size A4. The head was then capped and allowed to stand at 40° C. for 5 days. After cleaning of the head was then carried out three times, a printing operation was carried out. The results were evaluated based on the number of nozzles, which caused the deviation of the direction of ink ejection from a predetermined direction, or the number of clogged nozzles, among all the nozzles of the recording head. The evaluation criteria were as follows.

○: The deviation of the direction of ink ejection was observed in none of or one of the nozzles and none of clogged nozzles was observed.

Δ: The deviation of the direction of ink ejection was observed in 2 to 4 nozzles, or the number of clogged nozzles was 1 or 2.

x: The deviation of the direction of ink ejection was observed in 2 to 4 nozzles with the number of clogged nozzles being 1 or 2, the deviation of the direction of ink ejection was observed in 5 or more nozzles, or the number of clogged nozzles was 3 or more.

Evaluation 3

Rubbing Resistance

Printing was carried out on Epson printing paper (Seiko Epson Corp.), and the print was allowed to stand at room temperature for one hr. Thereafter, the full solid print area was rubbed with a clip while applying a predetermined load. The results were evaluated according to the following criteria:

⊙: Load of up to 500 g caused no stain of unrecorded area with ink.

○: Load of up to 200 g caused no stain of unrecorded area with ink.

x: Load of 200 g caused stain of unrecorded area with ink.

The results were as given in Table 2.

TABLE 2

| Ex. | Water resistance | Rubbing resistance | Clogging resistance |
|---|---|---|---|
| Ink B1 | ○ | ⊙ | ○ |
| B2 | ○ | ○ | ○ |
| B3 | ○ | ○ | ○ |

The ink compositions of the above examples were used for printing on XEROX-R Raper (Fuji Xerox Co., Ltd.), a regenerated paper. As a result, all the ink compositions provided a good image having neither feathering nor blurring.

Further, the observation of these inks under an ultramicroscope has revealed a Tyndall phenomenon, suggesting the presence of dispersed particles.

Example C1

Spirit Black SSBB (20 g, trade name, Orient Chemical Industries, Ltd., C.I. Solvent Black 5) a black dye, was added by portions to and dissolved in 80 g of N-methyl-2-pyrrolidone with heating and stirring to prepare a colorant solution. The whole of the colorant solution was added to 500 g of a stirred 10 wt% aqueous xylitol solution over period of one hr, thereby preparing a black ink dispersion. The average particle diameter of the colorant as measured by the light scattering method was 330 nm.

Example C2

Oleosol Black AR (20 g, trade name, Taoka Chemical Co., Ltd.), a black dye, was added by portions to and dissolved in 80 g of 2-pyrrolidone with heating and stirring to prepare a colorant solution. The whole of the colorant solution was added to 500 g of a stirred 15 wt% aqueous saccharose solution over a period of one hr, thereby preparing a black ink dispersion. The average particle diameter of the colorant as measured by the light scattering method was 320 nm.

Example C3

Oil Black FS Special A (30 g, trade name, Chuo Synthetic Chemical), a black dye, was added by portions to and dissolved in 100 g of γ-butyrolactone with heating and stirring to prepare a colorant solution. The whole of the colorant solution was added to 500 g of a stirred 15 wt% aqueous saccharose solution over a period of one hr, thereby preparing a black ink dispersion. The average particle diameter of the colorant as measured by the light scattering method was 220 nm.

Example C4

Oil Black FS Special A (20 g, trade name, Chuo Synthetic Chemical), a black dye, was added by portions to and dissolved in 90 g of 1,3-dimethylimidazolidinone with heating and stirring to prepare a colorant solution. The whole of the colorant solution was added to 500 g of a stirred 5 wt% aqueous mannitol solution over a period of one hr, thereby preparing a black ink dispersion. The average particle diameter of the colorant as measured by the light scattering method was 280 nm.

Example C5

Oil Black FS Special A (30 g, trade name, Chuo Synthetic Chemical), a black dye, was added by portions to and dissolved in 80 g of N-methyl-2-pyrrolidone with heating and stirring to prepare a colorant solution. The whole of the colorant solution was added to 500 g of a stirred aqueous mixed solution containing 10 wt% xylitol and 10 wt% sorbitol over a period of one hr, thereby preparing a black ink dispersion. The average particle diameter of the colorant as measured by the light scattering method was 230 nm.

Example C6

Spirit Black AB (20 g, trade name, Orient Chemical Industries, Ltd., C.I. Solvent Black 5), a black dye, was added by portions to and dissolved in 80 g of N-methyl-2-pyrrolidone with heating and stirring to prepare a colorant solution. The whole of the colorant solution was added to 600 g of a stirred 20 wt% aqueous saccharose solution over a period of one hr, thereby preparing a black ink dispersion. The average particle diameter of the colorant as measured by the light scattering method was 290 nm.

Example C7

Oil Black FS Special A (20 g, trade name, Chuo Synthetic Chemical), a black dye, was added by portions to and dissolved in 80 g of N-methyl-2-pyrrolidone with heating and stirring to prepare a colorant solution. The whole of the colorant solution was added to 600 g of stirred aqueous mixed solution containing 10 wt% maltitol and 5 wt% polyvinyl pyrrolidone (PVPK-15, Tokyo Chemical Industry Co., Ltd.) over a period of one hr, thereby preparing a black ink dispersion. The average particle diameter of the colorant as measured by the light scattering method was 180 nm.

The ink compositions thus prepared were evaluated in the same manner as described above in connection with the evaluation of the ink compositions of Examples B1 to B3.

The results were as given in the following table.

TABLE 3

| Ink Ex. | Resumption of successful printing after clogging (a) | Resumption of successful printing after clogging (b) | Water resistance | Rubbing resistance | Quality of print | Viscosity (cP) |
|---|---|---|---|---|---|---|
| C1 | ◉ | ◉ | ○ | ○ | ○ | 3.35 |
| C2 | ◉ | ◉ | ○ | ○ | ○ | 3.70 |
| C3 | ◉ | ◉ | ○ | ○ | ○ | 3.77 |
| C4 | ◉ | ◉ | ○ | ○ | ○ | 3.28 |
| C5 | ◉ | ◉ | ○ | ○ | ○ | 4.50 |
| C6 | ◉ | ◉ | ○ | ○ | ○ | 3.88 |
| C7 | ◉ | ◉ | ○ | ○ | ○ | 4.90 |

What is claimed is:

1. An ink composition comprising:
   a colorant which is either sparingly soluble or insoluble in water;
   a water-soluble organic solvent capable of dissolving the colorant;
   a saccharide and/or polyvinyl pyrrolidone; and water; said colorant being in a dispersed state in the ink composition and the ink composition being substantially free from any dispersant.

2. The ink composition according to claim 1, wherein the colorant is selected from the group consisting of an oil dye, a disperse dye, and a pigment readily soluble in a solvent.

3. The ink composition according to claim 1, wherein the content of the saccharide is not more than 50% by weight.

4. The ink composition according to claim 1, wherein the saccharide is δ-gluconic lactone, carboxymethyl cellulose, or hydroxypropyl starch.

5. The ink composition according to claim 1, wherein the content of the polyvinyl pyrrolidone is not more than 10% by weight.

6. The ink composition according to claim 1, wherein the polyvinyl pyrrolidone has a weight-average molecular weight of 1,000 to 1,000,000.

7. The ink composition according to claim 1, which comprises both the saccharide and the polyvinyl pyrrolidone.

8. The ink composition according to claim 1, which further comprises a water-soluble resin.

9. An ink jet recording method, comprising the step of ejecting droplets of an ink composition according to claim 1 onto a recording medium to form an image using the droplets.

10. A process for producing an ink composition according to claim 1, comprising the steps of:

(a) dissolving a colorant in a water-soluble organic solvent to prepare a colorant solution;

(b) adding water to the colorant solution and mixing to precipitate fine particles of the colorant, thereby preparing a dispersion of the colorant; and (c) adding a saccharide, and/or polyvinyl pyrrolidone to the dispersion.

11. A printed medium recorded by an ink jet recording method according to claim 9.

12. The ink composition according to claim 1, wherein the solubility of the colorant in water at 20° C. is not more than about 1% by weight.

13. The ink composition according to claim 1, wherein the solubility of the colorant in water at 20° C. is not more than about 0.5% by weight.

14. The ink composition according to claim 1, wherein the colorant is found in the ink composition as fine particles having an average particle diameter of about 10nm to 10μm.

15. The ink composition according to claim 1, wherein the colorant is found in the ink composition as fine particles having an average particle diameter of about 25nm to 500 nm.

16. A process according to claim 10 further comprising also adding an additive selected from the group consisting of penetration promoters, viscosity modifiers, surface tension modifiers, surfactants, pH adjustors, hydrotropy modifiers, humectants, antimolds, preservatives, chelating agents, rust preventives, and specific resistance modifiers to the dispersion in step (c).

17. An ink composition for use in ink jet printing wherein ink droplets of the composition are ejected from a nozzle, the composition comprising:

(a) a colorant which is either sparingly soluble or insoluble in water, said colorant being present in the composition in an amount of about 0.5 to 20% by weight;

(b) a water-soluble organic solvent capable of dissolving the colorant, said water-soluble organic solvent being present in the composition in an amount of about 1 to 35% by weight;

(c) water present as a major solvent; and (d) a saccharide or polyvinyl pyrrolidone present in the composition in an amount sufficient substantially to decrease a tendency of the ink composition to clog the nozzle during ink jet printing, said composition being substantially free from any dispersant.

18. A composition according to claim 17 wherein the composition consists essentially of the colorant, the water-soluble organic solvent, water and the saccharide or polyvinyl pyrrolidone.

* * * * *